United States Patent [19]

Papuchon et al.

[11] Patent Number: 4,571,080
[45] Date of Patent: Feb. 18, 1986

[54] MICHELSON INTERFEROMETER WITH A PHOTOREFRACTIVE MIRROR

[75] Inventors: Michel Papuchon; Hervé Arditty; Philippe Graindorge; Jean-Pierre Huignard, all of Paris, France

[73] Assignee: Thomson-CSF, Paris, France

[21] Appl. No.: 425,698

[22] Filed: Sep. 28, 1982

[30] Foreign Application Priority Data

Nov. 9, 1982 [FR] France ............................. 81 20958

[51] Int. Cl.⁴ .............................................. G01B 9/02
[52] U.S. Cl. ..................................... 356/345; 356/347
[58] Field of Search ............... 356/345, 347, 348, 350, 356/351

[56] References Cited

U.S. PATENT DOCUMENTS

| 4,198,162 | 4/1980 | Bjorklund et al. | 356/351 X |
| 4,304,458 | 12/1981 | Huignard et al. | 356/347 X |
| 4,353,616 | 10/1982 | Leclerc et al. | 350/3.75 |
| 4,442,455 | 4/1984 | Huignard et al. | 356/347 X |

FOREIGN PATENT DOCUMENTS 0026128 4/1981 European Pat. Off. .
2385079 10/1978 France .
2416452 8/1979 France .

OTHER PUBLICATIONS

Siegman, "Dynamic Interferometry and Differential Holography of Irregular Phase Objects Using Phase Conjugate Reflection" *Optics Communications*, vol. 31, No. 3, pp. 257–258, Dec. 1979.

*Primary Examiner*—Davis L. Willis
*Assistant Examiner*—Matthew W. Koren
*Attorney, Agent, or Firm*—Oblon, Fisher, Spivak, McClelland & Maier

[57] ABSTRACT

The invention relates to the interferometric detection of reciprocal and non-reciprocal effects affecting the propagation of optical radiation in a two-armed interferometer. The invention relates to a two-armed interferometer terminating by a photorefractive medium used as an interactive reflector according to the four-wave interferometer principle.

The invention particularly applies to the measurement of physical quantities such as displacement, linear velocity, angular velocity, magnetic field, pressure and temperature.

12 Claims, 5 Drawing Figures

MICHELSON INTERFEROMETER WITH A PHOTOREFRACTIVE MIRROR

BACKGROUND OF THE INVENTION

The present invention relates to interferometers constructed on the basis of the Michelson interferometer principle. The Michelson interferometer generally comprises a monochromatic radiation source, an optical beam splitting means such as a semitransparent plate, which supplies two measuring arms terminated by mirrors and a radiation detector arranged so as to collect in superimposed manner via the optical splitting means the radiation which has performed an outward and return movement along the two measuring arms. Such a device makes it possible to measure a large number of physical quantities able to affect the propagation of optical radiation along the measuring arms. Certain of these physical quantities cause reciprocal effects which produce the same transmission delay whatever the propagation direction of the optical radiation in each of the measuring arms. Other physical quantities lead to non-reciprocal effects which influence the transmission delay in a different manner as a function of the propagation direction of the optical radiation. The usually considered non-reciprocal effects are the Faraday effect and the relativistic inertial effect. The Faraday effect occurs when the measuring arm comprises a material medium in which a magnetic field creates a preferred electron spin orientation. The use of this effect has made it possible to adapt the interferometer to the measurement of electric currents. In this case the measuring arms can be looped by circulating the optical radiation in a waveguide, such as an optical fibre excited at each end. This makes it possible to eliminate the mirrors and the interferometer becomes an annular interferometer. The relativistic inertial effect used in an annular interferometer is called the Sagnac effect and the interferometer is then called a gyrometer.

The reciprocal effects are not linked with the destruction of the symmetry of the space or a material medium. They are observed when the measuring arms are the sources of mechanical, optical or thermal stresses.

When a Michelson interferometer is used for measuring a particular physical quantity, it is generally sensitive to other physical quantities which may falsify the measurement.

In the case of a reciprocal effect, the mirrors conventionally fitted at the end of the measuring arms make the latter appear twice as long as they are in reality, which is a major disadvantage on wishing to measure a nonreciprocal effect.

In addition, optical reflector systems are known, which are based on the use of photorefractive media making it possible to reflect an incident wave front in the form of a conjugate wave front. An ordinary mirror reflects the light as if it came from a virtual object not coinciding with the object illuminating the mirror. However, a photorefractive medium can reflect a wave front having a conjugate phase, which returns to the object radiation isomorphic of that which came therefrom. In the case of reciprocal effects, this interactive reflection ensures the insensitivity to such effects, provided that they have not varied during the outward and return passage of the radiation and the photorefractive medium has been able to adapt to the variations of these effects. However, this ability to cancel out the reciprocal effects is not prejudicial to the interferometric measurement of the non-reciprocal effects, which provides new possibilities for the use of the Michelson interferometer in a field conventionally reserved for the annular interferometer.

BRIEF SUMMARY OF THE INVENTION

The present invention relates to a Michelson interferometer having a photorefractive mirror comprising a monochromatic radiation source, an optical beam splitter distributing the first and second portions of said radiation to two measuring arms terminated by reflectors and a photodetector arranged so as to collect in superimposed manner via the optical splitter those portions of the radiation having performed the outward and return movements along the said arms wherein the first and second radiation portions intersect within a photorefractive medium, a reflector being arranged so as to reflect the first of said radiation portions which has traversed it to the photorefractive medium under a normal incidence.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
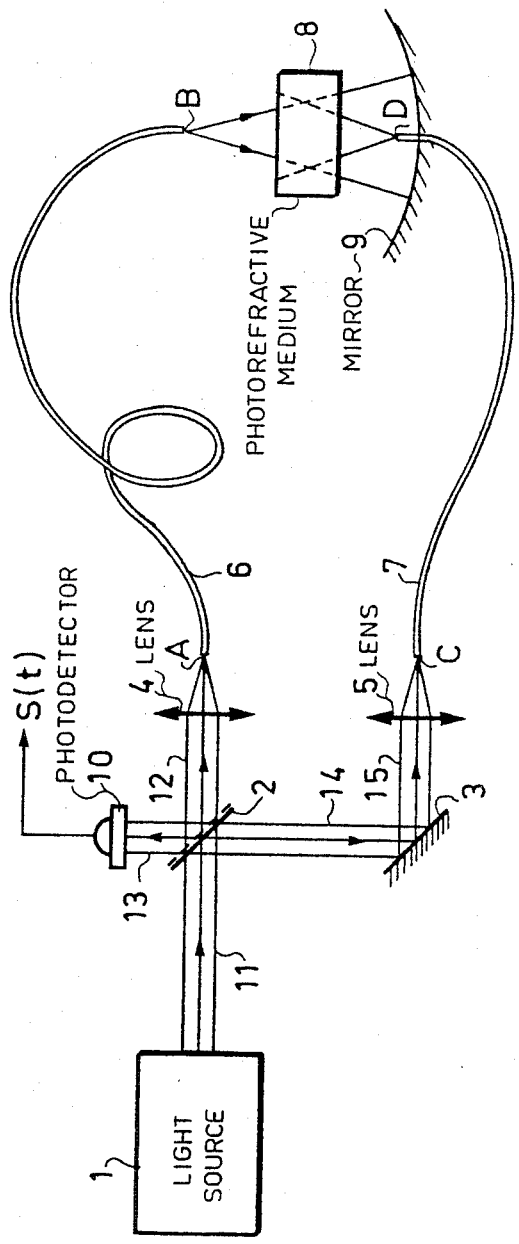
FIG. 1 a first embodiment of an interferometer according to the invention.

FIG. 1 shows an interferometer having two arms differing from a Michelson interferometer through the use of a photorefractive reflector in place of conventional mirrors.

In common with the conventional Michelson interferometer, the interferometer shown has a monochromatic radiation source 1, which emits a beam 11 in direction of an optical splitter 2, constituted, for example, by a semireflecting flat plate. The incident radiation 11 on plate 2 is subdivided into a first transmitted portion 12 and a second reflected portion 14. The transmitted portion 12 is focused by a lens 4 to the intake A of a first optical waveguide 6, which reemits this radiation portion by its outlet B.

The reflected portion 14 is returned by a mirror 3 to a lens 5, which focuses the radiation 15 on to the inlet C of a second optical waveguide 7. The end D of waveguide 7 radiates a divergent beam, which meets the divergent beam radiated by end B of waveguide 6. In the case of a conventional Michelson interferometer, it would be possible, for example, to metallize terminations B and D in order to reflect the two radiation portions to plate 2 ensuring their superimposition in a beam 13. The interference of these two radiation portions is detected by photodetector 10, which supplies a signal S(t) representing the passage of the interference fringes. The two measuring arms of the interferometer then comprise on the one hand elements 4, 6 and on the other elements 3, 5, 7.

According to the invention, the interferometer of FIG. 1 uses a photorefractive medium 8 and a concave spherical mirror 9 for reflecting from B to A and from D to C the radiation portions which have circulated in the two measuring arms. The concave spherical mirror 9 is arranged so as to receive across medium 8, a spherical wave front from end B, in such a way that wave front is reflected under a normal incidence and is focused on end B. Except for the presence of medium 8, this reflective termination of waveguide 6 is of a conventional nature.

With regards to the reflecting termination of waveguide 7, the photorefractive medium 8 cooperates with mirror 9 and the pumping radiation from end B and returns to end D radiation having the conjugate phase of the radiation emitted by said end D and which spontaneously converges there.

The photorefractive medium can be crystals of bismuth-silicon oxide (BSO), bismuth-germanium oxide (BGO), as well as barium titanate $BaTiO_3$ and potassium niobate $KNbO_3$.

A photorefractive medium is a photoexcitable medium in which the incident photons create charge carriers, which can diffuse into the material when the illumination has dark areas alternating with light areas. This medium is also electrooptical, which makes it possible to observe the refractive index variations produced by the internal electric field, which in turn results from the migration of the charge carriers. On the basis of these properties, it is possible to optically condition the photorefractive medium by bringing about the interference there of a signal beam and a pumping beam. The fringe pattern produces index lines which, by diffracting the pumping beam, can produce a conjugate signal beam. This is produced in accordance with the four wave interferometry method, when the pumping beam which has passed through the medium is reflected back towards the latter by a mirror ensuring the reverse return.

FIG. 1 shows that the radiation emerging from end B and traversing photorefractive medium 8 reaches the reflecting surface of mirror 9 under a normal incidence and this mirror returns it to end B after traversing medium 8. This radiation can be considered as the pumping beam of photorefractive medium 8.

The radiation from end D of waveguide 7 then constitutes a signal beam which, within the photorefractive medium 8, interferes with the pumping beam. This interference spatially modulates the refringent properties of the photorefractive medium and leads to the development there of an index line system, which can be considered as a dynamic hologram of the structure of the radiation contained in the signal beam. By receiving the pumping radiation which traverses the photorefractive medium 8 after normal reflection on spherical mirror 9, the dynamic hologram diffracts towards end D of waveguide 7, a conjugate reconstruction of the radiation emerging from said end. If the radiation emerging from the end D in the direction of the photorefractive medium is a progressive electromagnetic wave, the conjugate reconstruction is the associated regressive electromagnetic wave having isomorphic wave fronts with change of sign of the phase shift, the latter being evaluated by taking as the reference the phase reference of the pumping beam.

On the basis of what has been stated hereinbefore, it is apparent that the line pattern of the photorefractive medium 8 behaves like a reflective mirror with respect to end D of the second measuring arm of the interferometer. This reflecting function imposes no special condition on the signal beam, provided that the reflection of the pumping radiation by mirror 9 retains the shape of the wave fronts. Thus, a monomode waveguide 6 is chosen and the radiation source 1 must be able to supply a radiation with an appropriate coherent length. Source 1 is, for example, a helium-neon laser or a monomode semiconductor laser. It is also possible to use a mode filter for eliminating the interfering oscillation modes and to this end optical splitter 2 can be effective when in the form of an integrated optical circuit with monomode waveguides.

When the reflecting mirror is constituted by a dynamic hologram resulting from the interaction in photorefractive medium 8 of radiation from ends B and D of the two measuring arms of the interferometer, there are numerous consequences. One of these is that the second interferometer arm can, without disadvantage, comprise a multimode optical fibre 7. The other consequences will be better understood by considering the reciprocal and non-reciprocal effects occurring the measuring arms of the interferometer and by taking account, if applicable, of the time for establishing the dynamic hologram.

In order to clarify the description of the operating mode, a study will firstly be made of the detection by fringe displacement of the reciprocal and non-reciprocal effects exclusively affecting the second arm of the interferometer and after this what happens in the case of the fist measuring arm will be considered.

On assuming that a reciprocal effect produces a phase shift $\Delta\phi$ between C and D, said phase shift will also be produced between D and C during the reverse return along the second measuring arm. In this case the reflecting effect of the photorefractive medium leads to a signal beam with the conjugate phase $-\Delta\phi$ being transmitted to end D. The algebraic sum of the phase shifts caused by a reciprocal effect for an outward and return passage of the radiation in the second interferometer arm leads to no fringe displacement in the established operating mode. The interferometer is insensitive to the reciprocal effect, whereas in the case of a conventional mirror there would have been a displacement of the fringes proportional to $2\Delta\phi$. The insensitivity to the reciprocal effect can be imperfect if the effect has varied between the outward and return passage, which assumes an extremely rapid variation in practice. However, the ability to adapt the photorefractive medium can lead to a slow variation of the reciprocal effect being followed with agility by the dynamic hologram, whereas a more rapid variation leads to a lag and as a result this type of variation is discerned by a displacement of the fringes. By acting on the nature of the photorefractive material, the spacing of the lines, the irradiation intensity and the presence of an external electric field, it is possible to define a time constant which measures the time of establishing a dynamic hologram. This makes it possible to attribute a high-pass filter characteristic to the interferometer with a view to the selective detection of reciprocal effects.

On now assuming that a non-reciprocal effect between C and D produces a phase shift $\Delta\theta$, the phase shift produced between D and C is $-\Delta\theta$. It is assumed that the non-reciprocal effect has the same amplitude in both cases, which is usually the case in practice. As the photorefractive medium 8 generates the conjugate phase shift $-\Delta\theta$, it can be seen that the outward and return passage in the second measuring arm has led to a phase shift $-2\Delta\theta$, which produces a displacement of the fringes. If it had been a conventional mirror, the non-reciprocal effect would have produced no displacement of the fringes. The interferometer of FIG. 1 can therefore be used in measuring the electric current via the Faraday effect or in measuring a gyration speed by means of the relativistic effect. In this type of application, an electrical conductor is wound around at least one of the waveguides 6 and 7 or at least one of the latter is wound round a mandrel, as in the case of annular interferometers.

It is now a question of considering the interferometric detection of a reciprocal or non-reciprocal effect applied to the first measuring arm.

Figure 2:
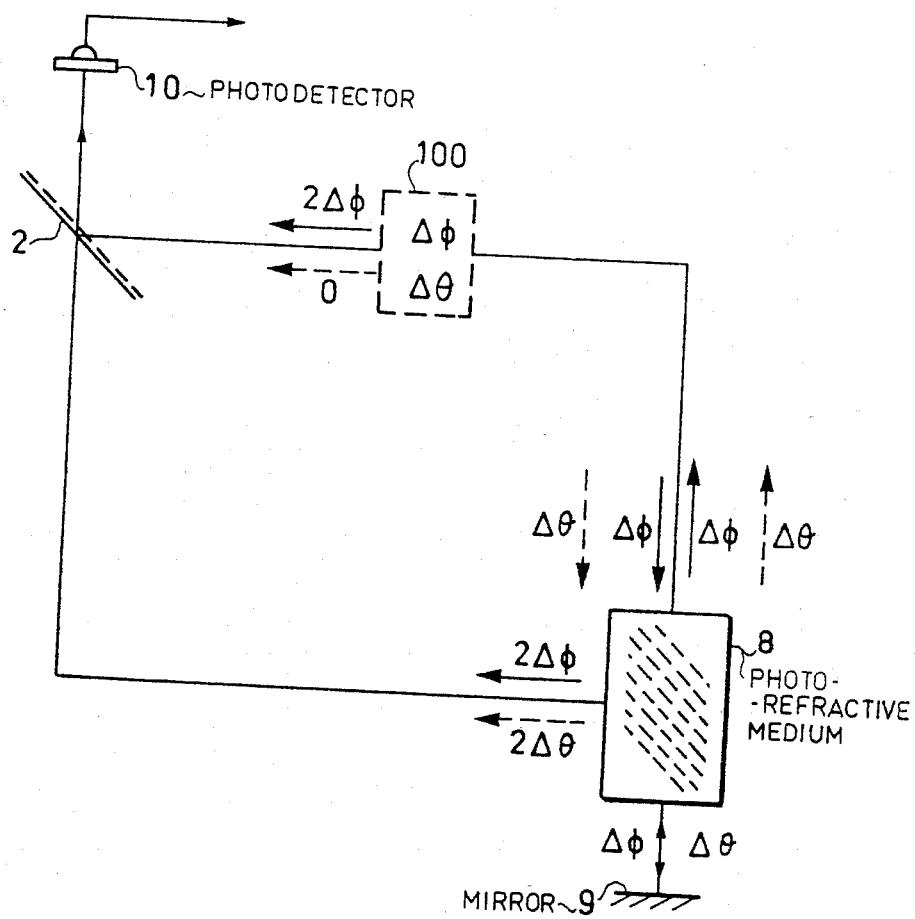
FIG. 2 an explanatory drawing relating to the diagram of FIG. 1.

FIG. 2 diagrammatically shows the essential elements of FIG. 1 with, in the first measuring arm, a fictitious source 100 symbolizing the manifestation of a reciprocal effect by a phase displacement $\Delta\phi$ and that of a non-reciprocal effect by a phase displacement $\Delta\theta$.

The unbroken line arrows represent the circulation of radiation with the phase displacement obtained as a result of a reciprocal effect. The dotted line arrows give the same type of information for a non-reciprocal effect.

With regards to the reciprocal effect and on starting from plate 2, it can be seen that the pumping wave reaches medium 8 with a phase shift $\Delta\phi$, which is retained until the reciprocal effect has doubled it during the reverse passage. The interaction within the photorefractive medium integrates a phase shift $\Delta\phi$, but during the generation of the conjugate signal radiation the phase shift $\Delta\phi$ of the pumping wave is added to the phase shift $\Delta\phi$ of the index pattern represented in FIG. 2 by dotted lines. As a result the radiated energy returned to plate 2 by the two measuring arms has undergone the same phase shifts $2\Delta\phi$ in such a way that no fringe displacement is detected by detector 10.

In the case of a non-reciprocal effect, the phase shifts $\Delta\theta$ and $2\Delta\theta$ obey the same relationships at the location of the photorefractive medium 8, but there is no phase shift of the radiation collected on return by plate 2 coming from the first measuring arm. Thus, detector 10 detects a displacement of the fringes proportional to $2\Delta\theta$. Due to the principle of superimposing effects, the general case amounts to what has been stated hereinbefore.

Figures 3, 4:
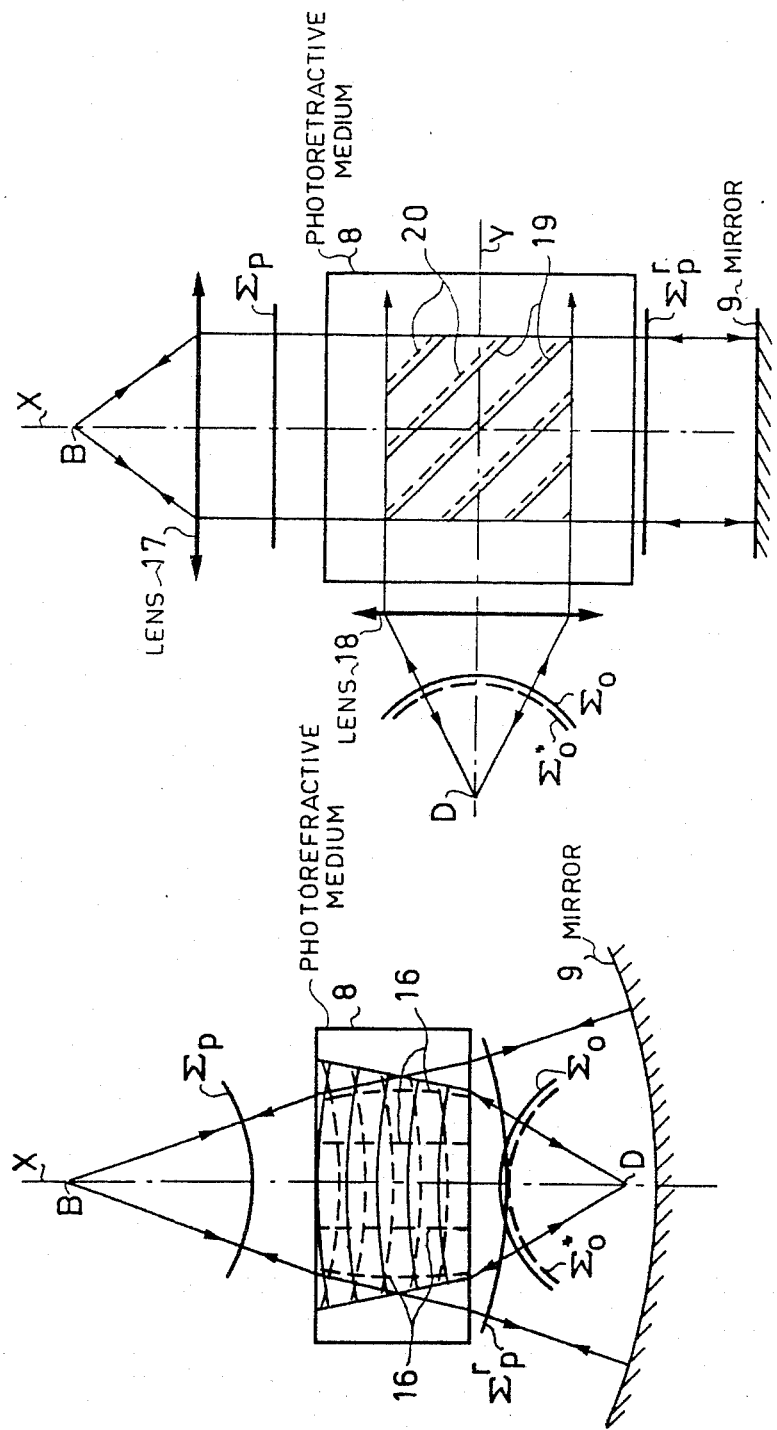
FIGS. 3 and 4 constructional details of the device of FIG. 1.

FIG. 3 shows the behaviour of the photorefractive medium with the configuration adopted in FIG. 1. The pumping wave of wave front $\Sigma_p$ centred on end B of the first measuring arm interferes with the signal wave of wave front $\Sigma_o$ fron end D of the second measurinng arm. Index lines 16 are thus created in medium 8. The pumping wave reflected by mirror 9 of centre B has a wave front $\Sigma_p{}^r$, which rises along axis X towards end B. This wave is diffracted by line 16 and gives rise to a conjugate reconstruction of the signal wave. This construction is characterized by the conjugate wave front $\Sigma_o{}^*$, which converges towards end D of the second measuring arm.

The arrangement shown in FIG. 4 has two collimating lenses 17 and 18 between photorefractive medium 8 and ends B and D. The photorefractive medium 8 has facets normal to two perpendicular axes X and Y. This arrangement makes it possible to obtain a relatively dense fringe pattern 19, in which the fringes are distributed in accordance with planes perpendicular to one of the bissectors of the axes X and Y. In this case, mirror 9 is planar and there is no need to provide a passage for the end of the second measuring arm. The index line grating 20 induced by the fringe pattern 19 is identical throughout the extent of the interaction zone, which makes it possible to obtain a homogeneous dynamic response. The radiation access according to two contiguous facets of medium 8 is advantageous in many ways.

Figure 5:
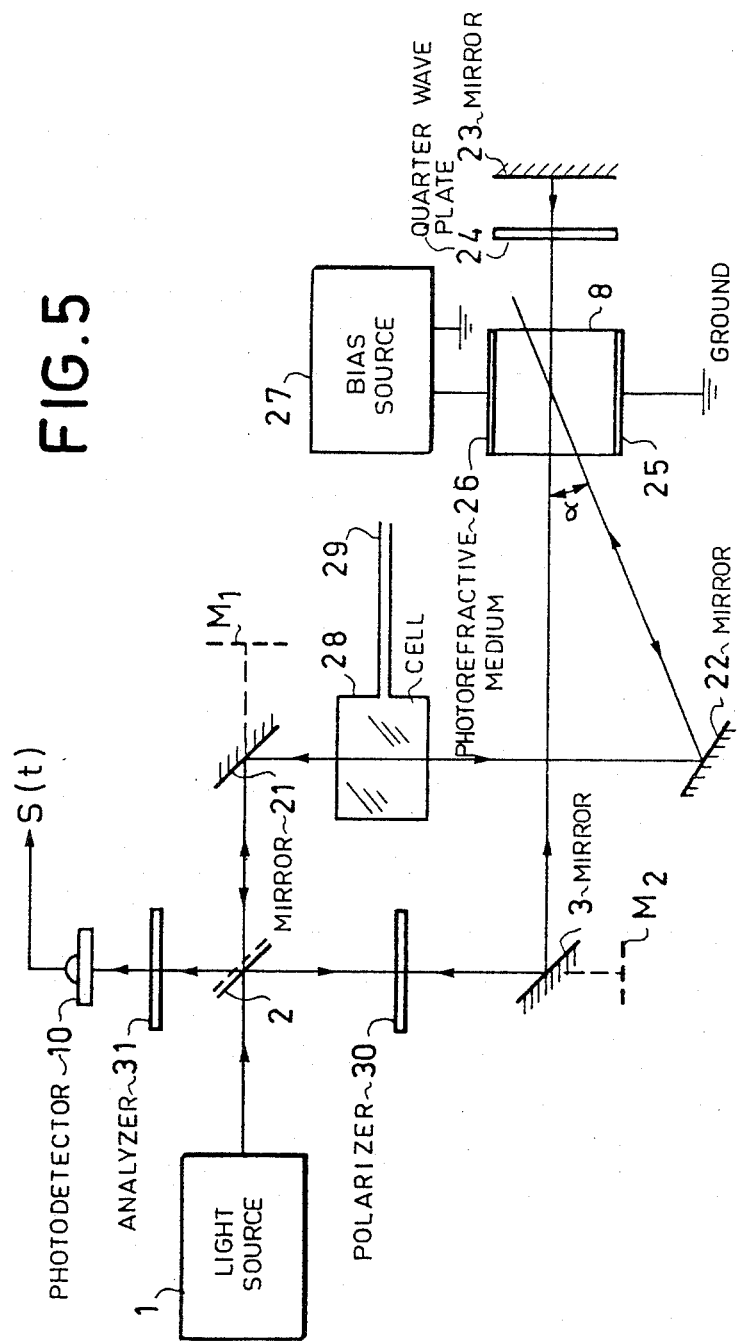
FIG. 5 another embodiment of an interferometer according to the invention.

Obviously the invention is not limited to the case of an interferometer having waveguides in the measuring arms. FIG. 5 shows a constructional variant of the interferometer according to the invention in which the first measuring arm, which carries the pumping radiation is that incorporating mirror 3. The second measuring arm, which carries the signal radiation, incorporates mirror 21 and a mirror 22 used for obtaining the intersection of the pumping and signal beams under an angle $\alpha$ in photorefractive medium 8. The reverse return of the pumping beam is ensured by mirror 23. A reciprocal effect generating element in the form of a transparent cell 28 is introduced into the second measuring arm and is provided with a tube 29 connected to a pressurized air source and the value thereof can be modulated. In order to accelerate the migration of the charge carriers, electrodes 25 and 26 are positioned on two opposite facets of the photorefractive medium 8, and are connected to an electric polarization generator 27. The conventional mirrors $M_1$ and $M_2$, illustrated in dotted line form, show the structure of the conventional Michelson interferometer and illustrate the basis of the present invention.

In order to improve the contrast of the fringes at photodetector 10, the polarization analyzer 31 is positioned between plate 2 and photodetector 10. A polarizer 30 positioned between plate 2 and photorefractive medium 8 cooperates with a quarter wave plate 24 located between the photorefractive medium 8 and reflecting medium 23 in order to supply to analyzer 31 during the reverse return an attenuated wave which is a function of the rotary power of the medium 8. Analyzer 31 also receives on return a diffracted signal wave having an elliptical polarization. Analyzer 31 is turned so as to obtain the best fringe contrast, which is dependent on the diffraction efficiency of photorefractive medium 8.

When tube 29 is supplied with low frequency-pulsed air, signal S(t) supplied by photodetector 10 does not change. On increasing the pulsating frequency, signal S(t) has an increasingly better response to the pulsation, because the inertia of the dynamic hologram has an effect and opposes the complete compensation of the reciprocal effect produced by cell 28. This high-pass filter characteristic is useful when it is desired to detect the alternating component of a pressure without being disturbed by slow interference. This case more particularly occurs during the detection of ultrasonic radiation in the presence of a slow variation hydrostatic pressure. The inertia of the dynamic hologram has a low-pass filtering effect on the detection of a non-reciprocal effect.

There is nothing to prevent the photorefractive medium 8 being positioned at the intersection of the radiation emerging from mirrors 3 and 21 in FIG. 5. Mirror 22 is eliminated, but electrode 26 is then a transparent electrode.

What is claimed is:

1. A Michelson interferometer having a photorefractive mirror, comprising:
   a monochromatic radiation source;
   an optical beam splitter for splitting radiation from said radiation source into a first portion and a second portion and for distributing the first and second portions of said radiation;

a photorefractive medium provided with a reflector adjacent one side of said photorefractive medium;

a first measuring arm for receiving the first portion of said radiation distributed by said splitter and for transmitting it to said photorefractive medium along a first predetermined direction such that said first portion of said radiation traverses through said photorefractive medium in a first predetermined direction and is reflected by said mirror back through said photorefractive medium in a second predetermined direction opposite said first predetermined direction back to said first measuring arm;

a second measuring arm receiving the second portion of said radiation distributed by said splitter and transmitting said second portion of said radiation to said photorefractive medium which reflects said second portion back to said second measuring arm, wherein said first and second radiation portions intersect and interact within said photorefractive medium and are then returned to said splitter via said first and second measuring arms, respectively;

a photodetector arranged in relation to said splitter to collect in superimposed relation said first and second portions of said radiation returned to said splitter.

2. An interferometer according to claim 1, wherein at least one of the arms has a monomode waveguide.

3. An interferometer according to claims 1 or 2, wherein at least one of said portions of radiation interacting in said photorefractive medium is a spherical wave.

4. An interferometer according to claim 1, wherein at least one of said portions of radiation interacting in the photorefractive medium is a plane wave.

5. An interferometer according to claim 1, wherein electrical polarization means are coupled with the photorefractive medium.

6. An interferometer according to claim 1, wherein the reflector is a spherical mirror.

7. An interferometer according to claim 1, wherein the reflector is a plane mirror.

8. An interferometer according to claim 1, wherein at the most one of the measuring arms has a multimode waveguide.

9. An interferometer according to claim 1, wherein at least one of the measuring arms is arranged so as to detect a non-reciprocal effect.

10. An interferometer according to claim 9, wherein the non-reciprocal effect is linked with the presence of a material medium in at least one of the measuring arms.

11. An interferometer according to claim 1 wherein polarization means are inserted in the measuring arms, a quarter wave plate being inserted between the photorefractive medium and the reflector.

12. An interferometer according to claim 1, wherein the material used as the photorefractive medium is chosen from the group consisting of bismuth-silicon oxide, bismuth-germanium oxide, barium titanate, and potassium niobate.

* * * * *